July 22, 1958 — J. MERCIER — 2,844,367
RESILIENT SYSTEM
Filed Aug. 27, 1956
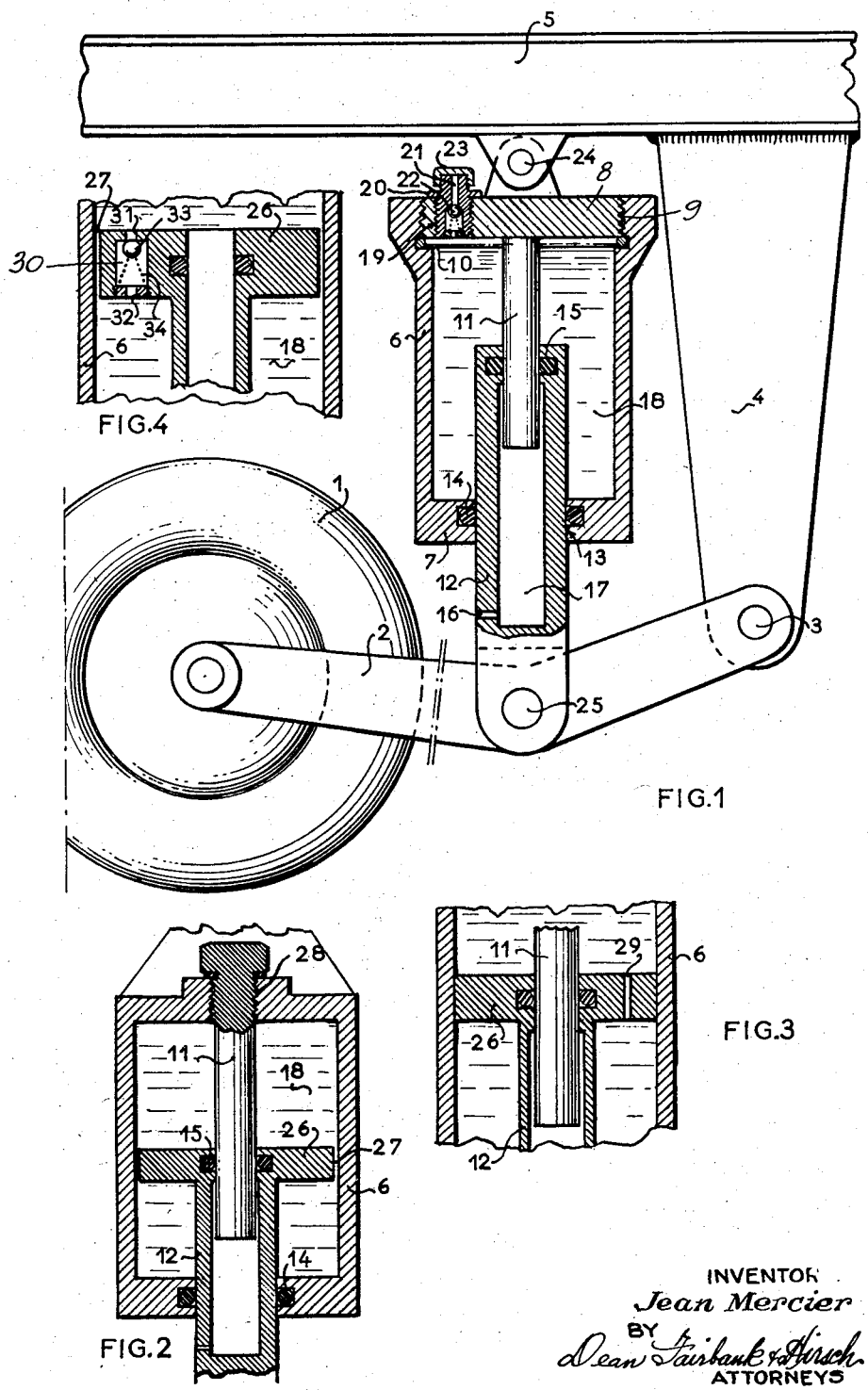
INVENTOR
Jean Mercier
BY
Dean Fairbank & Hirsch
ATTORNEYS

United States Patent Office 2,844,367
Patented July 22, 1958

2,844,367

RESILIENT SYSTEM

Jean Mercier, New York, N. Y.

Application August 27, 1956, Serial No. 606,272

6 Claims. (Cl. 267—15)

This invention relates to resilient systems of the type in which a plunger is progressively introduced into a container filled with a fluid of very low compressibility. This penetration of the plunger into the container determines a reduction of the capacity of the container, and hence a compression of the fluid which is resiliently opposed by the latter due to its very low compressibility.

In the present specification, as well as in the appended claims, the expression "fluid of very low compressibility" is used as a generic term for designating either a liquid such as oil or a silicon, or a gas such as air, previously compressed to a high rate.

With such a fluid of very low compressibility, it is clear that the variation of the container capacity must be very small with respect to its total value. In other words, the variation of the volume of the plunger inner part, as the same, penetrates into the container must be very small with respect to the volume of the mass of fluid in the container. In these conditions, in known resilient system of this type in which the plunger is merely constituted by a simple cylindrical rod, it is necessary to adopt a container of prohibitive bulk if the diameter of the plunger is not to be exceedingly reduced which would make it liable to axial flexure under the considerable loads to which such systems are usually subjected. Another drawback of these known systems is that the cylindrical rod is only guided by the thin head of the container through which it penetrates thereinto, so that it often undergoes axial misalignment leading to difficulties for obtaining a good tightness between the rod and the container head.

An object of the invention is to provide a resilient system of the type described, wherein the required compression of the fluid of very low compressibility, is obtained by progressively introducing into the container a hollow plunger slidably mounted with a tight fit, on the one hand, externally, as usual in one head of the container and, on the other hand, internally on a solid rod, rigid with the other head of the container.

This arrangement suppresses the two above mentioned main drawbacks of the known systems:

First of all, the variation of capacity of the container is equal to the product of the annular cross-section of the hollow plunger by the length of penetration of the same into the container. In other words, the said variation of capacity does not depend on the diameters of the two rods but only on their difference, which permits adopting any desired values of said diameters, provided that their difference is sufficiently small.

Moreover, the slidable hollow plunger is guided both externally and internally, and the length along which it is guided internally, may be chosen as long as desired since it only depends on the length of the solid rod rigid with the container.

A further object of the invention is to complete this resilient system by damping means of the dash-pot type so as to combine energy dissipation or damping to the purely resilient resistance of the system. For this purpose, the inner end of the hollow plunger is merely enlarged into a piston head which may be provided with one or more calibrated ports or which may merely fit the container (which, in this case, is preferably cylindrical) loosely enough to provide a required degree of leakage.

Still another object of the invention is to incorporate a one-way passage controlled by a non-return valve in the above described piston head, so as to practically suppress the damping effect for one way of relative displacement between the plunger and the container. In particular, this feature may be used advantageously when the resilient system is interposed between a vehicle wheel and the chassis of the vehicle to act as a suspension device for the said wheel. In this case, the damping effect will be preferably suppressed during the rising stroke of the wheel to be exclusively used for the rebound or falling stroke. This arrangement permits reducing to a minimum the so-called hunting effect of the system.

If desired, the above mentioned non-return valve may be loaded by a spring of suitable calibration so that, even in that way of relative displacement for which the liquid flows freely through the passage controlled by the valve, a predetermined degree of damping is preserved.

Preferred embodiments of the invention will be hereinafter described with reference to the accompanying drawings, given merely by way of example and in which:

Fig. 1 is an axial sectional view of a resilient system according to the invention in an application in which the said system is interposed between a wheel of a vehicle and the chassis of the latter.

Fig. 2 is a view similar to Fig. 1, in which the system is completed by a damping piston head loosely fitted in the fluid container.

Fig. 3 shows an alternative construction in which the piston head is tightly fitted in the container but provided with a calibrated port, and Fig. 4 shows the device of Fig. 2 completed by a one-way passage controlled by a non-return valve.

In Fig. 1, a vehicle wheel 1 is carried by a lever 2 pivoted at 3 on a support 4, rigid with the chassis 5 of the vehicle.

A resilient system according to the invention is interposed between the wheel lever 2 and the chassis 5.

In the embodiment shown in Fig. 1, the said system comprises a cylinder 6 having two heads 7 and 8. In the example shown, for machining purposes, the head 8 is screwed in the cylinder 6 as shown at 9, packing means such as a ring 10 being provided to ensure tightness of this threading. A solid rod 11, integral with the head 8 of the cylinder 6, extends within said cylinder preferably as shown along its axis. A hollow plunger 12 is inserted into the cylinder 6 through a suitable aperture 13 provided for this purpose in the head 7. The inner diameter of the hollow plunger 12 is substantially equal to the diameter of the solid rod 11. The axis of the aperture 13 coincides with the axis of the cylinder 6 and that of the solid rod 11 so that the said plunger may be engaged as shown on the said solid rod. Packing means 14 and 15 are provided to ensure a tight fit of the hollow rod 12 in the apertures 13 and on the solid rod 11, respectively. A port 16 is provided through the annular wall of the plunger 12 to establish a communication of the inner space 17 of the same with atmosphere, so as to permit free relative motion between the hollow plunger 12 and the solid rod 11 in spite of their tight fit. In the position of equilibrium shown in Fig. 1, the inner space of the cylinder 6 limited by the total volume of the telescopic system of rods 11—12, is completely filled with a mass 18 of a fluid of very low compressibility. For introducing the said fluid into the cylinder 6, suitable filling means, such as a port 19, normally obturated by a plug 20 are incorporated in the head 8.

In the example shown, a passage 21 controlled by a non-return valve 22 runs throughout the plug 20. This passage, which is normally obturated by a cap 23 screwed on the plug 20, may be used for "inflating" the cylinder with a gas such as air compressed at a sufficiently high rate to constitute the above mentioned fluid of very low compressibility. Now the port 19 may be used, upon removal of the plug 20, for filling the cylinder 6 with a liquid.

In the application shown in Fig. 1 as a mere illustration, the cylinder 6 is pivoted at 24 on the chassis 5, while the hollow plunger 12 is pivoted at 25 on the wheel-carrying lever 2, this arrangement being obviously reversible.

The operation of the resilient system according to the invention in the particular application shown is obvious: when the wheel 1 tends to be raised, the plunger 12 tends to penetrate farther into the cylinder 6 which reduces the volume of the mass of fluid 18 by an amount equal to the product of the annular cross-section of the said plunger by the length of penetration of the same into the cylinder. This compression is strongly opposed by the fluid 18 due to the very low compressibility of the same, which results in a resilient resistance to the rising of the wheel 1, whereafter the liquid 18 tends to reassume its initial volume thus bringing the wheel 1 back into its initial position. It is to be noted that the fluid 18 is substantially aperiodic especially when it is a liquid, so that the suspension practically gives rise but to limited hunting effect.

Nevertheless in order to further reduce such hunting effect, the resilient system according to the invention may be completed by damping means of the dash-pot type opposing the displacement of the fluid in the cylinder in response to displacement of the plunger 12.

In the embodiment shown in Fig. 2, the said means are merely constituted by a piston head 26 rigid with or carried by the inner end of the plunger 12 and loosely fitted in the cylinder 6. With this arrangement, as the plunger 12 is displaced with respect to the cylinder 6, the fluid 18 is obliged to flow through the annular clearance 27 between the piston head 26 and the cylinder 6. In Fig. 2, as a constructive modification, the solid rod 11 is screwed at 28 in the cylinder head 8 instead of being integral therewith as shown in Fig. 1.

Alternatively, the piston 26 may be tightly fitted in the cylinder 6 and provided with one or more calibrated ports such as 29 (see Fig. 3) the restricted flow of the fluid then taking place through said port or ports. Now, in certain cases and, in particular, in the application of the device illustrated in Fig. 1, it may be advantageous to use the damping effect of the piston head 26 only for one way of relative displacement between the plunger 12 and the cylinder 6 and e. g. for that way which corresponds to the rebound stroke of the wheel 1. This may be obtained as shown in Fig. 4 by providing the piston head 26 with a passage 30 terminated by two openings 31 and 32 of which the first one is controlled by a ball 33 provided with a loading spring 34 continuously urging it towards the opening 31. With this arrangement, when the piston head 26 is raised with respect to the cylinder 6, the ball 33 is taken off its seat on the opening 31, under the action of the fluid pressure which becomes higher above the piston 26 than beneath the same, which permits flow of the fluid 18 not only through the clearance 27 (or through the port or ports 25 as the case may be) but also through the passage 30. If the latter is given a sufficient size, this will correspond to practically free flow of the fluid from the upper side of the piston 26 to its lower side. However, when the piston 26 is displaced downwardly with respect to the cylinder 6 (which corresponds, for example, to the rebound stroke of the wheel 1), the ball 33 is seated under the action of the fluid pressure which becomes higher beneath the piston 26 than above the same, so that the only passage afforded to the flow of fluid is then the annular clearance 27 (or the calibrated port or ports 29 as the case may be).

It is to be observed that, by suitably calibrating the spring 35, it is possible to oppose more or less considerable resistance to the unseating of the ball 33 or, in other words, to preserve a more or less considerable dash-pot effect even during the rising stroke of the piston 26.

In a general manner, while it has been in the above description, disclosed what is deemed to be practical and efficient embodiments of the invention, it should be well understood that it is not wished to be limited thereto as there might be changes made in the arrangement, disposition and form of the parts, without departing from the principle of the present invention.

This application is a continuation-in-part of application Serial Number 280,725, filed March 3, 1952, now Patent Number 2,771,968, dated November 27, 1956.

What is claimed is:

1. A resilient system comprising, in combinaton: a high pressure container provided with two opposed heads one of which is closed while the other one is provided with a bore, a solid cylindrical rod rigid with said closed head and extending within said container in co-axial relationship with said bore, a hollow plunger engaged with a tight fit in said bore and in telescoping relationship with said rod, means to fill with a medium of low compressibility all the space within said container externally of said rod and plunger, and means to establish a communication between the inner space of said plunger and the atmosphere.

2. A resilient system according to claim 1, further comprising a piston head rigid with the inner end of said plunger and loosely fitted in said container.

3. A resilient system according to claim 1, further comprising a piston head rigid with the inner end of said plunger and fitted in said cylinder and at least one calibrated port passing throughout said piston head.

4. A resilient system according to claim 1, further comprising a piston head rigid with the inner end of said plunger, a valve chamber in said head, said valve chamber communicating with both sides of said head through two ports, a ball seat on the inner edge of one of said ports, a ball in said chamber and spring means in said chamber to continuously urge said ball towards said seat.

5. A resilient system according to claim 4, wherein said piston head is loosely fitted in said container.

6. A resilient system according to claim 1, further comprising a piston head rigid with the inner end of said plunger, a passageway through said piston head and valve means associated therewith controlling the flow between the two sides of said piston head.

References Cited in the file of this patent

UNITED STATES PATENTS

| | | |
|---|---|---|
| 564,351 | Vaughan | July 21, 1896 |
| 2,346,667 | Dowty | Apr. 18, 1944 |
| 2,580,825 | Orloff | Jan. 1, 1952 |
| 2,756,952 | Gazley | July 31, 1956 |

FOREIGN PATENTS

| | | |
|---|---|---|
| 664,972 | Great Britain | Jan. 16, 1952 |